United States Patent
Erdloff

(10) Patent No.: US 7,404,344 B2
(45) Date of Patent: Jul. 29, 2008

(54) RATCHET DEVICE FOR AN ELECTRICAL COMPONENT WHICH MAY BE ADJUSTED BY ROTATION

(75) Inventor: Dirk Erdloff, Burglauer (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 276 days.

(21) Appl. No.: 11/056,153

(22) Filed: Feb. 14, 2005

(65) Prior Publication Data

US 2005/0139033 A1 Jun. 30, 2005

(51) Int. Cl.
*G05G 3/00* (2006.01)
(52) U.S. Cl. .......................................... 74/575; 267/158
(58) Field of Classification Search ................ 74/10.41, 74/10 R, 10.15, 10.6, 10.7, 527, 553, 578, 74/575–577 SF; 200/11 R, 11 TW, 564, 200/567, 336; 116/294, 309, 311, 315; 16/417, 16/110.1; 267/158
See application file for complete search history.

(56) References Cited

U.S. PATENT DOCUMENTS 2,631,211 A * 3/1953 Burkholder ................ 200/273

FOREIGN PATENT DOCUMENTS

| DE | 195 05 737 C1 | 2/1995 |
| DE | 295 01 692.2 U1 | 5/1995 |
| FR | 2694126 A1 * | 1/1994 |

* cited by examiner

*Primary Examiner*—Richard W L Ridley
*Assistant Examiner*—Terence Boes
(74) *Attorney, Agent, or Firm*—Muncy, Geissler, Olds & Lowe, PLLC

(57) ABSTRACT

A ratchet device for an electrical component that can be adjusted by rotation, such as a rotary switch or a rotary potentiometer, is provided. The ratchet device includes a leaf spring, resting against a ratchet contour by means of spring pressure, whereby the ratchet contour is applied on an outer side of a symmetrical ratchet disc. The leaf spring substantially encloses the ratchet disc, rests diametrically on the ratchet disc, and the ends of the leaf spring have an essentially radial embodiment, the leaf spring being otherwise free to move.

16 Claims, 5 Drawing Sheets

RATCHET DEVICE FOR AN ELECTRICAL COMPONENT WHICH MAY BE ADJUSTED BY ROTATION

This nonprovisional application claims priority to International Application PCT/EP2004/005551, which was filed on May 24, 2004, which claims priority to German Patent Application No. 103 23 544.2, which was filed in Germany on May 24, 2003, and which are both herein incorporated by reference.

BACKGROUND OF THE INVENTION

1. Field of the Invention

The present invention relates to a ratchet device for an electrical component that may be adjusted by rotation, in particular a rotary switch or rotary potentiometer, having a leaf spring that contacts a ratchet contour under spring force.

2. Description of the Background Art

Examples of electrical components that may be adjusted by rotation include rotary switches or rotary potentiometers, such components being used where frequent adjustment of the operating states or preset values is intended. In such circumstances, a ratchet device makes it easy for an operator to locate operating states, which the ratchet device makes perceptible by tactile and sometimes also audible means during the rotary motion. Particularly in the case of resistors that can be adjusted by rotation, the adjustment is made perceptible by a ratchet device. The ratchet means of a ratchet device typically includes a spring element, which generally has a curved projection called a detent projection, and a ratchet disk having one or more adjacent ratchet indentations that has a ratchet contour which cooperates with the detent projection. One of the two ratchet means, either the detent projection or the ratchet contour, is rotationally fixed to an actuator of the relevant component. The other ratchet means, in contrast, is held stationary on the component. The two ratchet means slide relative to one another during the rotary motion, and in the process the ratchet means produce tactile ratchet indications.

Known from German utility model 295 01 692 is a ratchet device consisting of an outer housing and an inner rotor, which rotor is connected to a rotationally adjustable operating element, and a leaf spring arranged in the interior of the rotor. At one point on the rotor, a detent projection of the leaf spring projects out of the cylindrical rotor wall into a ratchet contour located on the inner circumferential surface of the outer housing. During rotary motion, the detent projection initially twists and is pushed back by the rotor wall. When the detent projection snaps into a recess of the ratchet contour, the leaf spring immediately relaxes and strikes the side wall. This impact is audible.

Another arrangement of this generic type of a ratchet device in a component, which may be adjusted by rotation is disclosed in DE 195 05 737. In order to facilitate the defined setting of an angle of rotation, two flat springs are clamped on the inside floor of the housing base. These springs have convexities to interact with a ratchet disk. On its periphery the ratchet disk has, associated with each spring, two corresponding ratchet notches for the adjustable angle of rotation. In addition, the ratchet disk has on its peripheral surface a ramp for each flat spring; when the switch cam is rotated counterclockwise, these ramps provide a return torque to automatically return the switch cam to its base position. In addition, two stops are provided on the ratchet disk which interact with a projection formed on the inside floor of the housing base to limit the rotation of the switch cam.

SUMMARY OF THE INVENTION

It is therefore an object of the present invention to provide a ratchet device that permits the establishment of a defined torque profile with the simplest means and which at the same time has a compact construction.

This object is accomplished in accordance with the invention in that the ratchet contour is arranged circumferentially on a ratchet disk and the end regions of a leaf spring contact the ratchet contour under spring pressure, wherein the leaf spring is radially guided only in the end regions but is otherwise freely movable.

The inventive circumferential arrangement of the leaf spring with respect to the ratchet disk makes it possible to produce a defined torque at the ratchet device by the simplest means. The axial height of the ratchet device is limited to the ratchet disk and the leaf spring, and can thus be made as low as desired as a function of the torque to be produced. An additional advantage of the invention is that the leaf spring holds itself on the ratchet disk by its preloading and thus is easy to assemble.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
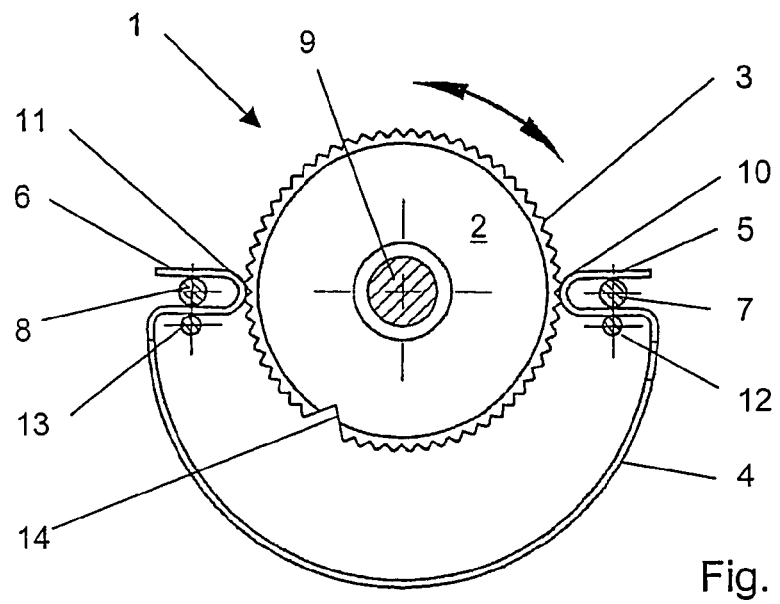
FIG. 1 is a top view of a ratchet device having external teeth according to an embodiment of the present invention.

FIG. 1 shows an embodiment of the ratchet device 1 according to the invention. The ratchet device 1 includes a ratchet disk 2 that has a peripheral ratchet contour 3, a leaf spring 4 that has U-shaped bends at its ends 5, 6, and pins 7, 8 on which the ends 5, 6 of the ratchet spring 4 are guided radially. The ratchet device 1 stands in connection with an operating element (not shown) of the ratchet device 1 at a center 9 of the ratchet disk 2.

The leaf spring 4 is bent at substantially right angles toward the ratchet disk 2. In the contact region 10, 11, the leaf spring 4 is bent in a U-shape so that the ends 5, 6 of the leaf spring point away from the ratchet disk 2. The curvature of the leaf spring 4 in the contact region 10, 11 is chosen to allow the leaf spring 4 to snap gently into the ratchet contour 3. The diameter of the curved regions is between one-half and three times the pitch of the teeth of the ratchet contour 3.

The curved ends 5, 6 (detent projections) of the leaf spring 4 permit an advantageous gentle sliding without abrupt loading of the ratchet disk 2 while at the same time permitting radial guidance of the leaf spring 4 on the pins 7, 8. The guidance of the leaf spring 4 in the immediate vicinity of the ratchet disk 2 simultaneously offers the advantage that jumping and twisting of the ratchet spring are prevented. The leaf spring 4 can be additionally stabilized by, for example, an appropriate design of the pins with stops and/or grooves, for example, as shown in FIGS. 6A, 6B, 7A, and 7B, to guide the detent projections 5, 6 of the leaf spring 4. In this context, the leaf spring 4 is guided radially, and possibly retained by stops and/or grooves, only at its curved ends 5, 6.

In order to stabilize the position of the leaf spring 4, it is proposed, in accordance with an embodiment of the present invention, to arrange additional guide pins 12, 13 outside the detent projections 5, 6 in addition to the pins 7, 8 that are arranged inside the detent projections 5, 6. This results in the advantage that the tolerance in bending the detent projections 5, 6 can be, for example, less precise for radially guiding the detent projections 5, 6. The radial guidance of the detent projections 5, 6 then takes place between the guide pins 12, 13 and the pins 7, 8; the leaf spring 4 is thus guided without play. In this context, the gap between the pins 12 and 7, and between the pins 13 and 8, ranging in size from retention without play to an appropriately selected play between the leaf spring 4, the guide pins 12, 13, and the pins 7, 8, can be used to set the sound produced by actuation of the ratchet device 1, from a muffled, quiet click to a clear, loud click. The remaining portion of the leaf spring 4 is freely movable. Axial guidance of the leaf spring 4 serves only to define the position of the leaf spring 4 relative to the ratchet disk 2. This results in an additional advantage, namely that the ratchet disk 2 is always subjected to equal forces from the detent projections 5, 6 of the ratchet spring 4. The symmetrical force distribution likewise prevents the individual detent projections 5, 6 from lifting. At the same time, establishment of the appropriate contact force between the ratchet disk 2 and the leaf spring 4 prevents rattling of the leaf spring 4 under the influence of vibrations.

Figure 8:
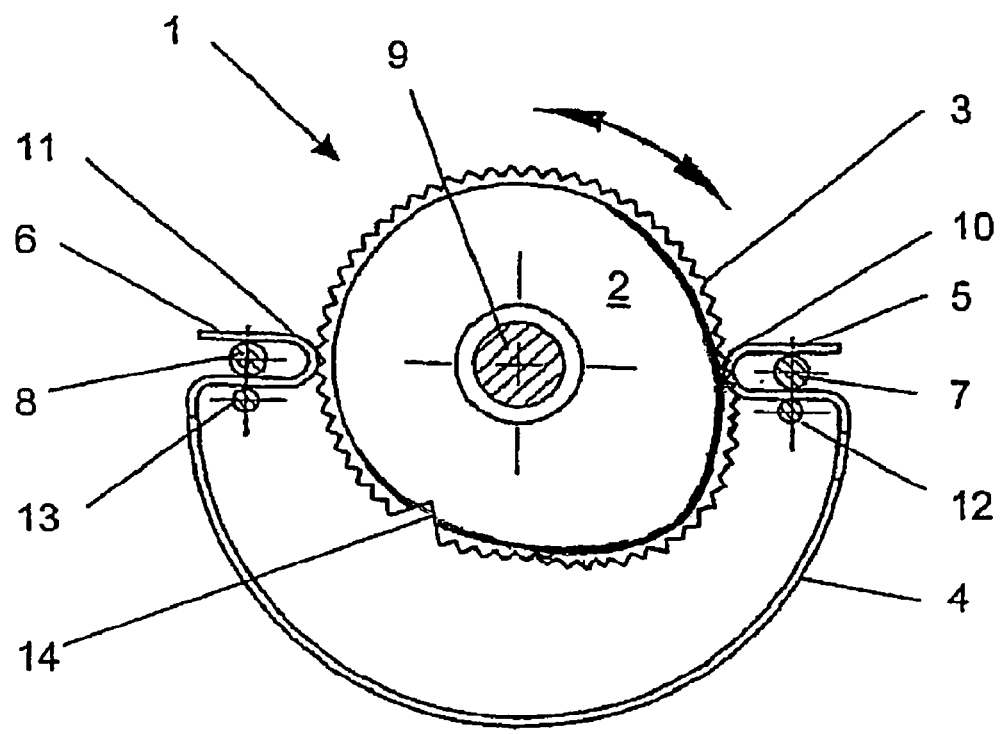
FIG. 8 is a top view of a ratchet device having a ratchet disk as a cam plate of differing diameters according to an embodiment of the present invention.

The leaf spring 4 produces an alternating torque in combination with the ratchet disk 2. The torque can be varied either by preloading of the leaf spring 4 or can be set by the profile of the ratchet contour 3. Another advantageous possibility according to the invention, for varying the torque profile of the ratchet device 1, is to design the ratchet disk 2 as a cam plate. In the example embodiment shown in FIG. 1, the ratchet disk 2 has a constant diameter. It is also possible according to the invention, however, to provide the periphery of the ratchet disk with differing diameters, for example so that cam plates are produced, as shown in FIG. 8. In conjunction with the design of the ratchet disk 2 as a cam plate, it is possible to produce any desired torque profile within the limits set by the geometry of the ratchet spring 4 in the contact region 10, 11.

In order to define specific settings of the electrical component by the ratchet device 1, it is further proposed in accordance with the invention to provide recesses 14 on the periphery of the ratchet contour 3. During rotation of the ratchet disk 2, the detent projection 5, 6 snaps into a recess 14 and the operator is able to recognize this position of the component as a defined setting. Thus, any desired number of settings of the component can be defined by providing multiple recesses 14 in the periphery of the ratchet disk 2.

Figure 2:
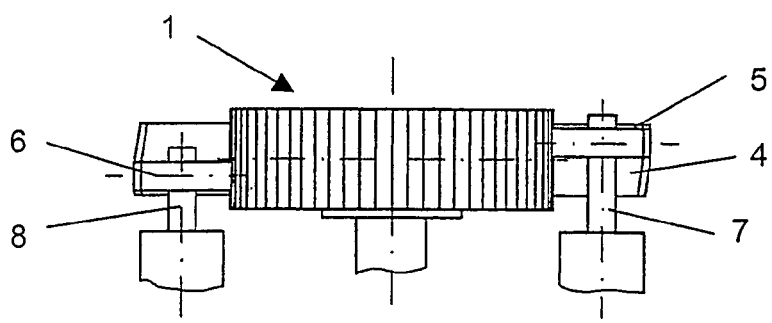
FIG. 2 is a side view of a ratchet device having external teeth according to an embodiment of the present invention.

FIG. 2 shows a side view of the ratchet device 1 according to the invention. The detent projections 5, 6 are held by the pins 7, 8. The pins here are fastened to the housing of the electrical component. The leaf spring 4 is tapered and axially offset in the region of the detent projections 5, 6, so that the leaf spring 4 contacts axially different regions of the ratchet disk 2. Now, if recesses 14 are provided at different asymmetrical positions on the periphery of the ratchet disk in the axially different contact regions, then each respective detent projection 5, 6 will snap into the recess 14 at a different time. In this way, an even more precise division of the settings of the different ratchet positions can be accomplished, or non-uniform pitch values can be produced in the ratchet.

In the example embodiment shown, the ratchet contour 3 is applied to the entire peripheral surface of the ratchet disk 2. However, it is also possible according to the invention to provide only a portion of the peripheral surface of the ratchet disk 2 with a ratchet contour 3. Thus, for example, the ratchet contour can be applied to the peripheral surface of the ratchet disk 2 over, for example, only 180° so that only one detent projection 5, 6 is engaged with the ratchet contour 3 during actuation of the component. Of course, recesses 14 can also be provided at the end of such a smooth peripheral surface of the ratchet disk 2.

In addition to the recesses 14, it is likewise possible to apply raised areas to the peripheral surface of the ratchet contour. These raised areas then circumferentially strike the detent projections and thus limit the angle of rotation of the component, or function like recesses with torque peaks in the torque profile, but with inverse sign. Of course, any combination of the ratchet contour 3, smooth peripheral surface, recesses 14 and raised areas are possible as well.

Figure 9:
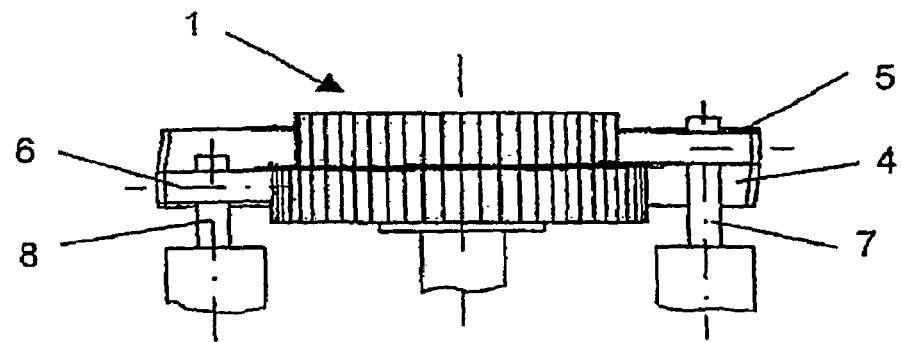
FIG. 9 is a side view of a ratchet device having two ratchet disks of constant diameter according to an embodiment of the present invention.
Figure 10:
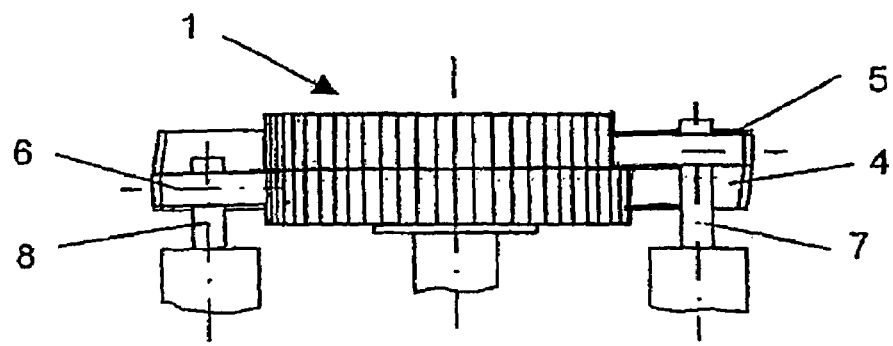
FIG. 10 is a side view of a ratchet device having a ratchet disk as two cam plates according to an embodiment of the present invention.
Figure 11:
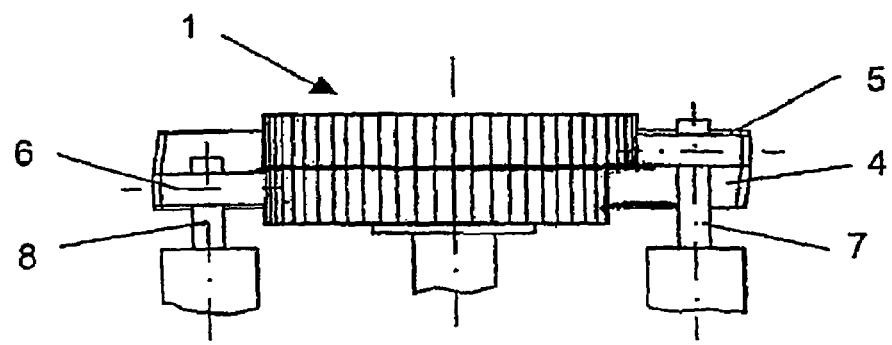
FIG. 11 is a side view of a ratchet device having a ratchet disk as a constant diameter ratchet disk and a cam plate according to an embodiment of the present invention.

In accordance with an embodiment of the invention, it is possible to divide the ratchet disk 2 in the axial direction so that at least two stacked ratchet disk regions 2 are formed and each detent projection 5, 6 contacts a separate ratchet disk region 2, as shown, for example, in FIGS. 9, 10, and 11. The separate ratchet disk regions can either have a constant diameter, as shown, for example, in FIG. 9, or can also be designed as cam plates. as shown, for example, in FIG. 10. A combination of constant diameter and cam plate is likewise possible according to the invention, as shown, for example, in FIG. 11. In this way, the ability now is created to transfer any desired torque profile to the actuator of the component.

Figure 3:
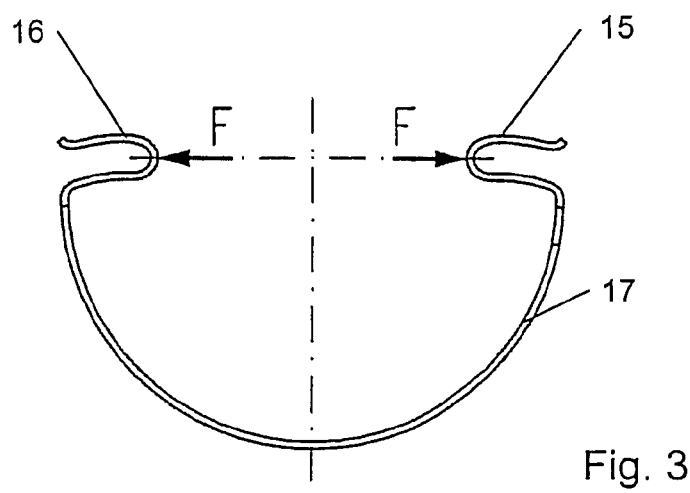
FIG. 3 shows an alternative embodiment of a leaf spring for use in a ratchet device.

Depending on the size of the excursion of the detent projections 5, 6 of the leaf spring 4, the contact points between detent projections 5, 6 and ratchet disk 2 shift relative to the axis of the ratchet disk 2. This so-called center offset can be compensated by the design of the detent projections 15, 16 shown in FIG. 3. The detent projections 15, 16 here are curved in a U-shape with their curved region facing toward the ratchet disk 2, and are also arched. A center offset can be compensated according to the invention by the arched design of the detent projections 15, 16, so that the point of application of force of the ratchet spring 17 always acts perpendicularly on the ratchet disk 2.

Figure 4:
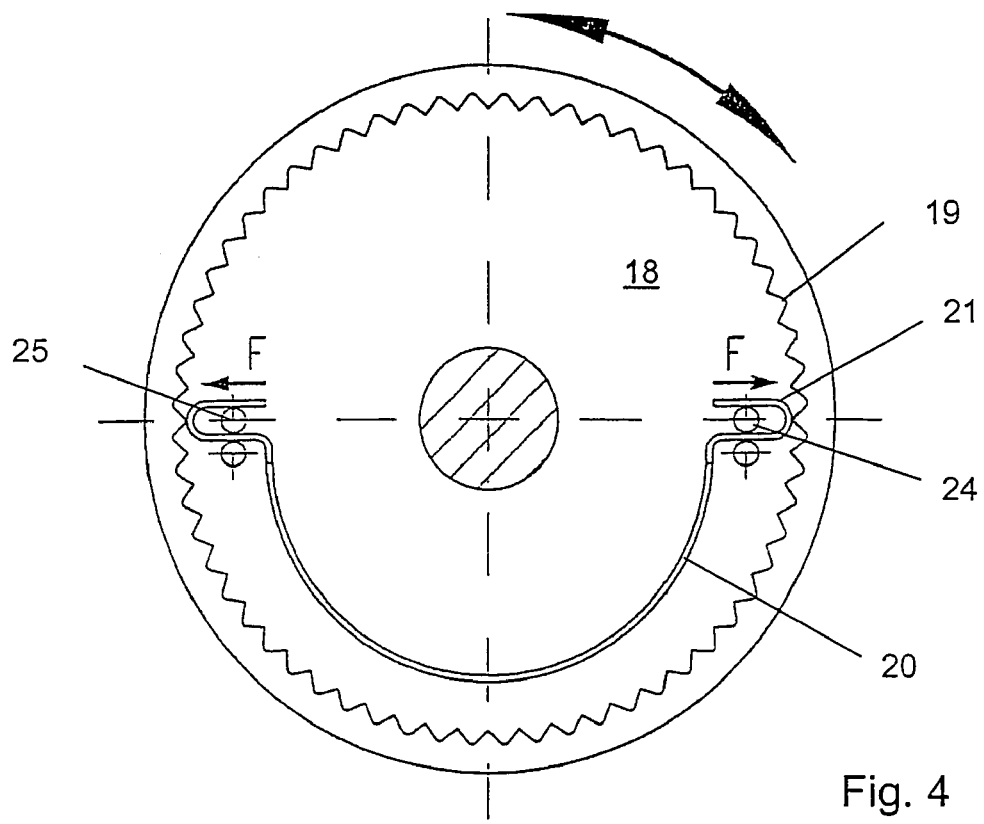
FIG. 4 is a top view of a ratchet device having internal teeth according to an alternate embodiment of the present invention.

In another embodiment of the invention, it is also possible to equip the ratchet disk 18 with internal teeth 19, as shown in FIG. 4. In principle, the ratchet spring 20 is supported in the same manner as in the case of the externally toothed ratchet disk 2, except that the detent projections 21, 22 are bent radially outward and act against the inner contour. The spring force F of the ratchet spring 20 acts outward against the internal teeth 19 of the ratchet disk 18 here. The use of a ratchet spring 20 which acts radially outward is possible, depending on the design constraints for installation of the ratchet device 1.

Figure 5:
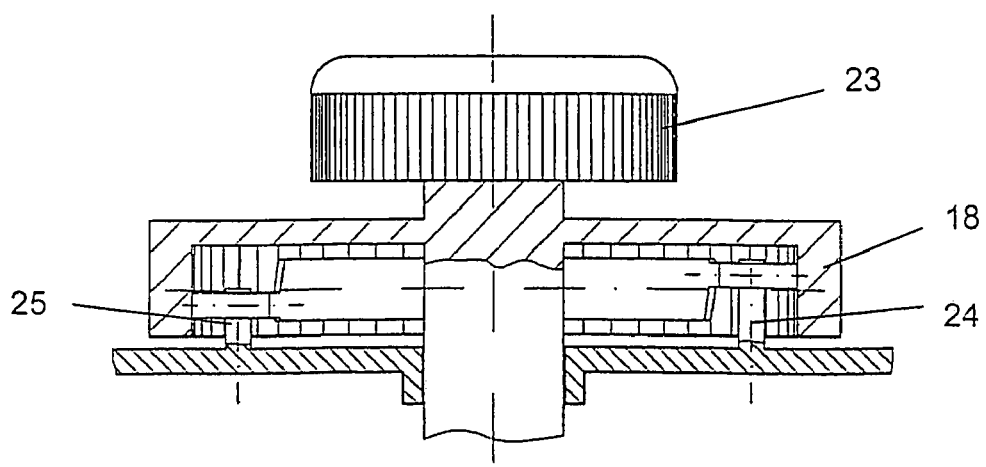
FIG. 5 is a side view of an embodiment according to the invention of the ratchet device with internal teeth.
Figure 6A:
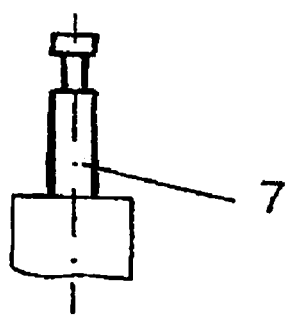
FIGS. 6A and 6B are side views of pins of a ratchet device according to embodiments of the present invention.
Figure 6B:
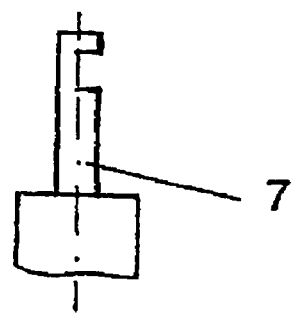
Figure 7A:
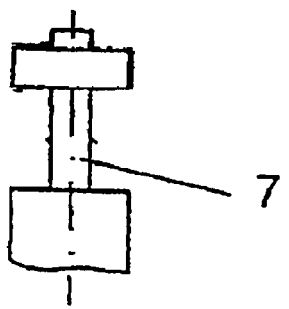
FIGS. 7A and 7B are side views of pins of a ratchet device according to embodiments of the present invention.
Figure 7B:
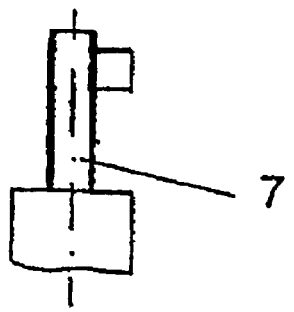

FIG. 5 shows a section through the side view of a ratchet disk 18 provided with internal teeth 19 and an operating knob 23 attached to the ratchet disk. With a mode of operation which is in principle identical for external teeth 3 and internal teeth 19 on the ratchet disks 2, 18, the design features described for the ratchet disk 2 are also applicable to the ratchet disk 18. The operating knob 23 has a cylindrical shape, wherein a raised area extending over the entirety of the grip portion 23 is formed on the top. The retaining pins 24, 25 can be fastened directly to the control panel or can form part of the ratchet device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ratchet device for an electrical component which may be adjusted by rotation, the ratchet device comprising:
    a leaf spring that contacts a ratchet contour under spring force,
    wherein the ratchet contour is circumferentially arranged on a ratchet disk,
    wherein end regions of the leaf spring contact the ratchet contour under spring pressure,
    wherein the leaf spring is radially guided only in the end regions but is otherwise freely movable, and
    wherein ends of the leaf spring are tapered and axially offset, and contact axially different regions of the ratchet disk.

2. The ratchet device according to claim 1, wherein the ratchet contour is formed on an outer edge of the ratchet disk, and wherein the leaf spring encloses at least a portion of a periphery of the ratchet disk and diametrically contacts the ratchet disk.

3. The ratchet device according to claim 1, wherein the ratchet contour is located on an inner edge of the ratchet disk, and wherein the leaf spring diametrically contacts the ratchet contour.

4. The ratchet device according to claim 1, wherein ends of the leaf spring are bent substantially at right angles toward the ratchet contour and have a U-shaped geometry so that detent projections are formed, wherein a curved region of the detent projections contact the ratchet contour, and wherein the ratchet device has pins on which the detent projections are guided radially.

5. The ratchet device according to claim 4, wherein the curved region of the detent projections has a diameter that is between one-half and three times a pitch of teeth of the ratchet contour.

6. The ratchet device according to claim 4, wherein legs of the detent projections are arched to compensate for a center offset between the detent projections and the ratchet disk.

7. The ratchet device according to claim 4, wherein each of the detent projections is radially guided by one or more pins arranged inside, or arranged inside and outside, of the U-shaped geometry.

8. The ratchet device according to claim 4, wherein the pins are provided with stops and/or grooves in which the leaf spring is held axially.

9. The ratchet device according to claim 4, wherein the pins are arranged in an immediate vicinity of the ratchet disk so as to prevent jumping of the leaf spring.

10. The ratchet device according to claim 1, wherein the ratchet disk has a constant diameter and wherein there is arranged on a periphery of the ratchet disk at least one into which detent projections of the leaf spring can snap so that a fixed setting of the component can be determined.

11. The ratchet device according to claim 1, wherein the ratchet disk has different diameters.

12. The ratchet device according to claim 1, wherein the electrical component is a rotary switch or rotary potentiometer.

13. A ratchet device for an electrical component which may be adjusted by rotation, the ratchet device comprising:
    a leaf spring that contacts a ratchet contour under spring force,
    wherein the ratchet contour is circumferentially arranged on a ratchet disk,
    wherein end regions of the leaf spring contact the ratchet contour under spring pressure,
    wherein the leaf spring is radially guided only in the end regions but is otherwise freely movable,
    wherein the ratchet disk is divided in an axial direction and divided sections of the ratchet disk have constant or different diameters, and wherein detent projections of the leaf spring are axially offset, so that each detent projection contacts a different region of the ratchet disk.

14. A ratchet device for an electrical component which may be adjusted by rotation, the ratchet device comprising:
    a leaf spring that contacts a ratchet contour under spring force,
    wherein the ratchet contour is circumferentially arranged on a ratchet disk,
    wherein end regions of the leaf spring contact the ratchet contour under spring pressure,
    wherein the leaf spring is radially guided only in the end regions but is otherwise freely movable,
    wherein the ratchet disk is divided in an axial direction,
    wherein a first divided section of the ratchet disk has a first constant diameter and a second divided section of the ratchet disk has a second constant diameter which is different from the first constant diameter of the first divided section, and
    wherein detent projections of the leaf spring are axially offset, so that each detent projection contacts a different region of the ratchet disk.

15. A ratchet device for an electrical component which may be adjusted by rotation, the ratchet device comprising:
    a leaf spring that contacts a ratchet contour under spring force,
    wherein the ratchet contour is circumferentially arranged on a ratchet disk,
    wherein end regions of the leaf spring contact the ratchet contour under spring pressure,
    wherein the leaf spring is radially guided only in the end regions but is otherwise freely movable, wherein the ratchet disk is divided in an axial direction, wherein a first divided section of the ratchet disk has a constant diameter, wherein a second divided section of the ratchet disk has a cam plate, and wherein detent projections of the leaf spring are axially offset, so that each detent projection contacts a different region of the ratchet disk.

16. A ratchet device for an electrical component which may be adjusted by rotation, the ratchet device comprising:

a leaf spring that contacts a ratchet contour under spring force, wherein the ratchet contour is circumferentially arranged on a ratchet disk, wherein end regions of the leaf spring contact the ratchet contour under spring pressure, wherein the leaf spring is radially guided only in the end regions but is otherwise freely movable, wherein the ratchet disk is divided in an axial direction, wherein a first divided section of the ratchet disk has a first cam plate, wherein a second divided section of the ratchet disk has a second cam plate, and wherein detent projections of the leaf spring are axially offset, so that each detent projection contacts a different region of the ratchet disk.

* * * * *

UNITED STATES PATENT AND TRADEMARK OFFICE
CERTIFICATE OF CORRECTION

PATENT NO. : 7,404,344 B2  Page 1 of 1
APPLICATION NO. : 11/056153
DATED : July 29, 2008
INVENTOR(S) : Erdloff It is certified that error appears in the above-identified patent and that said Letters Patent is hereby corrected as shown below:

Title Page
<u>Add Information on Priority Data</u>:

(30) Foreign Application Priority Data
May 24, 2003 (DE).............................10323544.2

Signed and Sealed this

Twenty-third Day of September, 2008

JON W. DUDAS
*Director of the United States Patent and Trademark Office*